(12) United States Patent
Duchatelle et al.

(10) Patent No.: US 8,152,447 B2
(45) Date of Patent: Apr. 10, 2012

(54) INTERMEDIATE CASING FOR AN AIRCRAFT JET ENGINE, OF IMPROVED DESIGN

(75) Inventors: Thierry Francois Maurice Duchatelle, Creteil (FR); Arnaud Sanchez, Brunoy (FR)

(73) Assignee: SNECMA, Paris (FR)

( * ) Notice: Subject to any disclaimer, the term of this patent is extended or adjusted under 35 U.S.C. 154(b) by 627 days.

(21) Appl. No.: 12/335,028

(22) Filed: Dec. 15, 2008

(65) Prior Publication Data
US 2009/0155063 A1 Jun. 18, 2009

(30) Foreign Application Priority Data

Dec. 18, 2007 (FR) ...................................... 07 59940

(51) Int. Cl.
F01D 1/02 (2006.01)
(52) U.S. Cl. ...................... 415/108; 415/119; 415/213.1; 415/214.1
(58) Field of Classification Search .................. 415/108, 415/119, 213.1, 214.1
See application file for complete search history.

(56) References Cited

U.S. PATENT DOCUMENTS

| 3,398,535 | A | | 8/1968 | Campbell et al. |
| 4,132,069 | A | | 1/1979 | Adamson et al. |
| 4,505,779 | A | * | 3/1985 | Boissevain ..................... 162/199 |
| 6,113,370 | A | * | 9/2000 | Volftsun .......................... 418/38 |
| 7,909,573 | B2 | * | 3/2011 | Cameriano et al. ........ 415/213.1 |
| 2010/0208860 | A1 | * | 8/2010 | Petrovich ...................... 376/347 |

FOREIGN PATENT DOCUMENTS

| EP | 1 707 487 A1 | 10/2006 |
| GB | 2 119 857 A | 11/1983 |

* cited by examiner

Primary Examiner — Gary F. Paumen
(74) Attorney, Agent, or Firm — Oblon, Spivak, McClelland, Maier & Neustadt, L.L.P.

(57) ABSTRACT

The invention relates to an intermediate casing (21) for an aircraft jet engine, comprising an outer shell (23) and also front and rear flanges (25, 27) which are arranged radially inside with respect to the outer shell, the casing (21) also comprising structural arms (17) which extend radially between the flanges as far as the shell (23), the rear flange being equipped with receiving means (34) for receiving a fixing bracket for fixing a rod for absorbing the thrust forces, and the first receiving means comprising bosses (36) coming from the rear flange, through which bosses through-orifices (38) are formed which are passed through by fixing screws of the bracket. According to the invention, at least one of the bosses (36) extends as far as making contact with one of the structural arms (17).

16 Claims, 3 Drawing Sheets

INTERMEDIATE CASING FOR AN AIRCRAFT JET ENGINE, OF IMPROVED DESIGN

The present invention relates generally to a propulsive assembly for an aircraft, of the type comprising a jet engine, a nacelle which surrounds the jet engine, and also a pylon provided with a rigid structure and attachment means for attaching the jet engine to the rigid structure.

More specifically, the invention relates to the intermediate casing of the jet engine of such an assembly.

The pylon, also known as the "EMS" ("Engine Mounting Structure") or "engine pylon", makes it possible to suspend the jet engine below the wing of the aircraft, or else to mount this jet engine above this same wing, or else to attach it to the rear part of the fuselage. The pylon is intended to constitute the connection interface between a jet engine and a given structural part of the aircraft. It makes it possible to transmit to the structure of this aircraft the forces generated by its associated jet engine, and also allows the routing of fuel, of electrical and hydraulic systems and of air between the engine and the aircraft.

For its part, the nacelle is conventionally equipped with a plurality of cowls which surround the jet engine and allow access to the latter in the open position, these cowls being known as fan cowls and thrust reverser cowls.

The jet engine comprises a fan casing which is extended towards the rear by a so-called intermediate casing, comprising an outer shell and also a front transverse flange and a rear transverse flange which are arranged parallel to one another and radially inside with respect to this outer shell, this intermediate casing also comprising structural arms which are distributed angularly and extend radially between the front and rear flanges as far as the outer shell.

Conventionally, the pylon comprises a rigid structure, also known as the primary structure, which may take the shape of a longitudinal box. The pylon also comprises attachment means for attaching the jet engine to the rigid structure, these means generally comprising a plurality of engine mounts and also a device for absorbing thrust forces, usually consisting of two force absorption rods.

These two rods are arranged symmetrically with respect to a vertical and longitudinal median plane of the propulsive assembly, each being oriented in such a way as to diverge from the aforementioned plane in the forward direction. Their front end is fixed to the rear flange of the intermediate casing, via a fixing bracket which is attached to this same flange.

The thrust forces passing through the force absorption rods, or axial forces, are therefore directly introduced into the intermediate casing, and more specifically into the rear flange of the latter. Given the very high intensity of these thrust forces, the solutions of the prior art provide for a complex design of the intermediate casing in the vicinity of the means for receiving the two fixing brackets of the rods, which is naturally penalising in terms of the overall weight and also in terms of the size, whereas the zone in question is already of considerable size, in particular due to the presence and/or passage of equipment in the inter-flange space.

The object of the invention is therefore to propose an intermediate casing for an aircraft jet engine which remedies at least partially the abovementioned problems relating to the embodiments of the prior art.

To this end, the invention relates to an intermediate casing for an aircraft jet engine, comprising an outer shell and also a front transverse flange and a rear transverse flange which are arranged parallel to one another and radially inside with respect to said outer shell, said intermediate casing also comprising structural arms which are distributed angularly and extend radially between said front and rear flanges as far as said outer shell, said rear flange being equipped with first receiving means for receiving a first fixing bracket for fixing a first rod for absorbing the thrust forces of the jet engine, said first receiving means comprising bosses coming from said rear flange, through each of which bosses at least one through-orifice is formed which is designed to be passed through by a fixing screw of said first fixing bracket, said through-orifices being spaced apart angularly with respect to the structural arms. According to the invention, at least one of said bosses extends as far as making contact with one of said structural arms.

Consequently, with the arrangement according to the invention, the thrust forces coming from the first force absorption rod pass successively into the associated fixing bracket, into the fixing screws and then into the bosses which generally correspond to an increased thickness of the rear flange, before arriving at one or more of the structural arms connected to these bosses, and offering satisfactory rigidity in the axial direction. This preferred route for forces which is formed with the aid of the boss(es) connected to one or more of the structural arms therefore makes it possible to offer an effective solution for transferring thrust forces, without generating any problem of weight or size, due to the simplicity of the design adopted.

Preferably, for better transfer of the thrust forces in the direction of the structural arms, each of the bosses extends as far as making contact with one of these structural arms.

In this regard, it may be provided that some of the bosses extend as far as making contact with a given structural arm, and that the other bosses extend as far as making contact with the structural arm directly adjacent to said given structural arm. This situation is adopted in particular when the fixing bracket has an angular span which is slightly smaller than the angular span defined between the two directly adjacent structural arms between which it is located. Nevertheless, the fixing bracket could have an angular span larger than the angular span defined between two directly adjacent structural arms, without departing from the scope of the invention.

Preferably, each boss extends over a substantially constant thickness, the thickness here being intended to be understood as the distance in the axial direction, starting from the surface of the flange from which the boss in question comes. Furthermore, their width is preferably also substantially constant, these bosses extending in the direction of their length, substantially orthogonally to their associated structural arm.

Preferably, each boss extends from a front face of said rear flange, that is to say into a so-called inter-flange space, namely opposite the front flange of the intermediate casing.

In this regard, it is noted that an additional boss which extends from a rear face of said rear flange is also associated with each of said through-orifices, this additional boss possibly being here of substantially circular conventional shape arranged around the fixing orifice passing through it, that is to say without necessarily being extended towards the adjacent structural arm as is the case for the aforementioned bosses. Thus, the fixing orifice passes successively through the boss extended as far as the associated structural arm, the rear flange and then the additional boss.

In this configuration, it is preferably provided that each additional boss has a support surface for supporting said first fixing bracket.

Still preferably, said first receiving means also comprise an orifice which is designed to house a shear pin of said first fixing bracket, this orifice preferably being located between the aforementioned fixing orifices. By way of example, this shear pin is provided for the passes of shear forces into the intermediate casing, the introduction of these shear forces oriented in the transverse plane of the jet engine resulting from the aforementioned inclination of the force absorption rods. Like the fixing screws, this shear pin is preferably oriented substantially axially.

In such a case, it is provided for example that the number of said bosses is four, each equipped with a single through-orifice which is designed to be passed through by a fixing screw of said first fixing bracket, and that said receiving means also comprise a reinforcing rib which is generally cross-shaped and comprises four branches extending from said rear flange, the centre of which cross passes through said orifice which is designed to house said shear pin, and the four ends of which cross make contact with said four bosses, respectively. Consequently, the shear forces coming from the first force absorption rod pass successively into the associated fixing bracket, into the shear pin, into the cross-shaped rib and then into the bosses, before also arriving at one or more of the structural arms connected to these bosses, and offering satisfactory rigidity in the transverse and vertical direction. This preferred route for forces which is formed with the aid of the boss(es) connected to one or more of the structural arms and with the aid of the cross-shaped rib, also referred to as the X-shaped rib, therefore makes it possible to offer an effective solution for transferring the shear forces, without generating any problem of weight or size, due to the simplicity of the design adopted.

Preferably, said reinforcing rib extends from a front face and also from a rear face of said rear flange, therefore making it a through-rib with respect to the latter. However, it could also be provided in such a way as to protrude from just one of the two faces of the flange, preferably from the rear face, without departing from the scope of the invention.

Furthermore, the second rod for absorbing thrust forces is associated with receiving means for receiving the bracket which are identical or similar to the first receiving means described above. Thus, in general, said rear flange is also equipped with second receiving means for receiving a second fixing bracket for fixing a second rod for absorbing the thrust forces of the jet engine, said second receiving means comprising bosses coming from said rear flange, through each of which bosses at least one through-orifice is formed which is designed to be passed through by a fixing screw of said second fixing bracket, said through-orifices being spaced apart angularly with respect to the structural arms, and at least one of said bosses extending as far as making contact with one of said structural arms.

Preferably, the intermediate casing is made in a single piece, by casting.

The invention also relates to a jet engine for an aircraft, comprising an intermediate casing as described above, said outer shell being arranged in the rear extension of the fan casing.

The invention also relates to a propulsive assembly for an aircraft comprising such a jet engine, and also a pylon of said jet engine comprising a rigid structure and also means for attaching said jet engine to said rigid structure, these attachment means comprising said first and second rods for absorbing the thrust forces.

Other advantages and features of the invention will become apparent from the following non-limiting detailed description.

This description will be given with reference to the appended drawings, in which.

Figure 1:
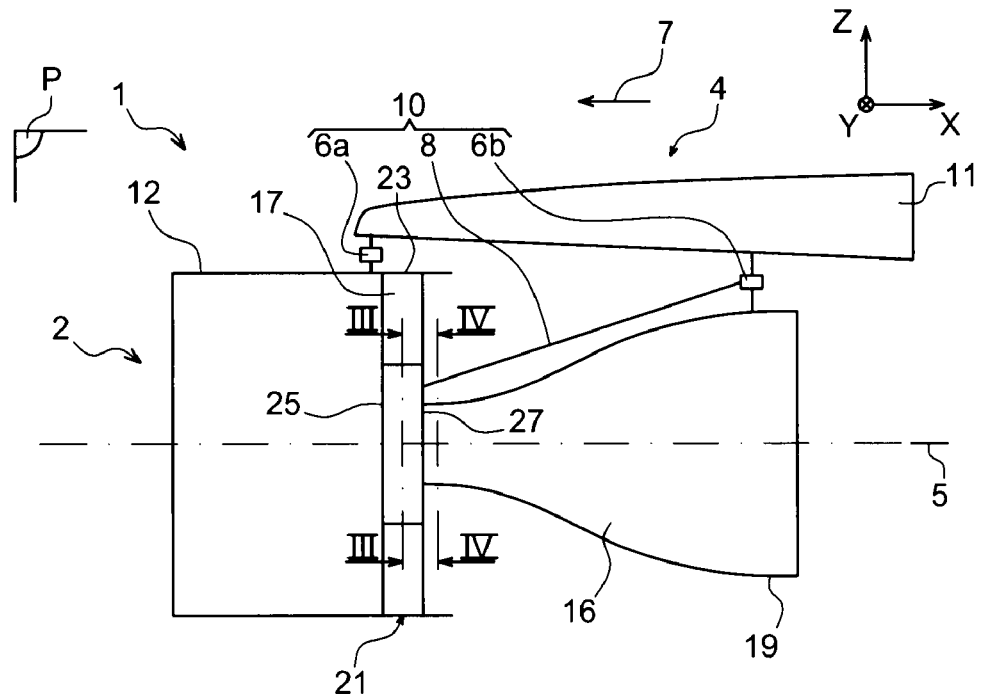
FIG. 1 shows a schematic side view of a propulsive assembly for an aircraft according to the present invention.

With reference to FIG. 1, there can be seen a propulsive assembly 1 for an aircraft according to one preferred embodiment of the present invention, this assembly 1 being designed to be fixed below an aircraft wing (not shown).

In general, the propulsive assembly 1, also known as an integrated propulsive system, is composed of a jet engine 2, a nacelle (not shown) and a pylon 4 provided with attachment means 10 for attaching the jet engine to this pylon, these means preferably consisting of a front engine mount 6a, a rear engine mount 6b and also a device for absorbing thrust forces which takes the form of two rods 8 (one being hidden by the other in FIG. 1). By way of example, it is noted that the assembly 1 comprises another series of mounts (not shown) which make it possible to suspend this assembly 1 below the wing of the aircraft.

Throughout the rest of the description, X conventionally denotes the longitudinal direction of the assembly 1 which is also assimilable to the longitudinal direction of the jet engine 2, this direction X being parallel to a longitudinal axis 5 of this jet engine 2. On the other hand, Y denotes the direction oriented transversely to the propulsive assembly 1 and also assimilable to the transverse direction of the jet engine 2, and Z denotes the vertical direction or the height direction, these three directions X, Y and Z being orthogonal to one another.

Furthermore, the terms "front" and "rear" are to be considered relative to a forward direction of the aircraft following the thrust exerted by the jet engine 2, this direction being shown schematically by the arrow 7.

It can be seen in FIG. 1 that only the engine mounts 6a, 6b, the thrust absorption rods 8 and the rigid structure 11 of the pylon 4 have been shown. The other constituent elements of this pylon 4 which are not shown, such as the attachment means for attaching the rigid structure 11 below the wing of the aircraft or else the secondary structure which segregates and holds the systems while supporting aerodynamic fairings, are conventional elements which are identical or similar to those encountered in the prior art and known to the person skilled in the art. Consequently, no detailed description of these will be given here.

Furthermore, the jet engine 2 is of a generally conventional design, namely comprising at the front a fan casing 12 which is extended towards the rear by an intermediate casing 21.

The intermediate casing 21 comprises an outer shell 23 located in the rear aerodynamic extension of the fan casing, and also transverse flanges 25, 27 which are arranged radially inside with respect to this outer shell 23, the intermediate casing 21 also comprising structural arms 17 which are distributed angularly and extend radially between the flanges 25, 27 as far as the outer shell 23, with which they make contact.

The jet engine finally comprises a central casing 16, also known as the "core" casing, which extends the intermediate casing 21 towards the rear, starting from the rear transverse flange 27 to which it is attached. Finally, it is noted that the central casing extends as far as a rear end 19 of larger size, also known as the exhaust casing.

The front engine mount 6a is arranged between the front end of the rigid structure 11, also known as the primary structure, and the fan casing 12 or the outer shell 23 of the intermediate casing 21.

The rear mount 6b is for its part arranged between the rigid structure 11 and the rear end 19 of the central casing 16. The two engine mounts 6a, 6b are passed through by a median plane P oriented vertically and longitudinally and passing through the axis 5.

Figure 2:
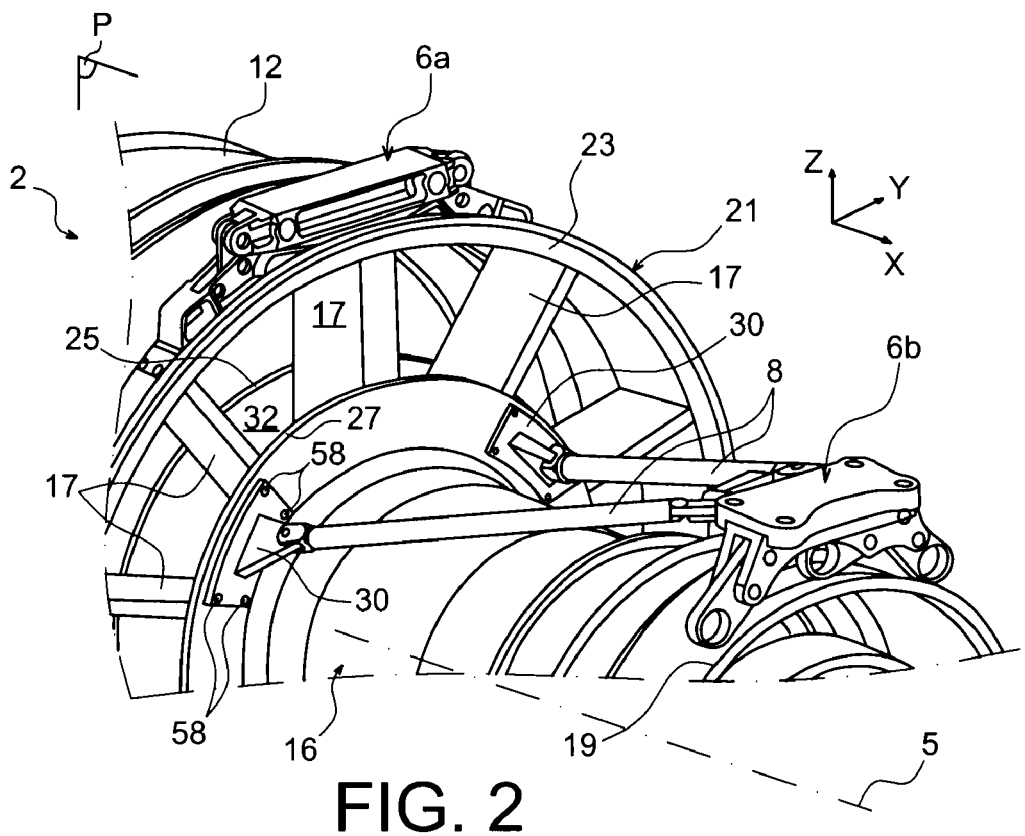
FIG. 2 shows a partial perspective view of the assembly shown in FIG. 1, illustrating in a more detailed manner the intermediate casing of the jet engine.

This same plane P forms a plane of symmetry for the two thrust force absorption rods 8, on either side of which they are located, respectively. As can be seen from FIG. 2, each rod 8 has a rear end articulated on a body of the rear engine mount 6b, and also a front end attached to the transverse flange 27, via a fixing bracket 30 mounted on this flange. In this same figure, it can be seen that the rear transverse flange 27 and the front transverse flange 25, each having the shape of a disc or ring oriented transversely, are spaced apart from one another in the direction X, forming between them a space 32 referred to as the inter-flange space, into which there penetrates each of the structural arms or outlet guide vanes 17.

One of the special features of the present invention lies in the design of the receiving means for receiving the fixing brackets 30, which will be described for one of the two rods 8 with reference to FIGS. 3 to 6. In this regard, the receiving means for receiving the other bracket 30 associated with the second force absorption rod are of an identical or similar design and will therefore not be described further. Moreover, it is noted that the second receiving means associated with the second bracket and with the second rod are preferably symmetrical to the first receiving means associated with the first bracket and with the first rod, with respect to the aforementioned plane P.

Figure 3:
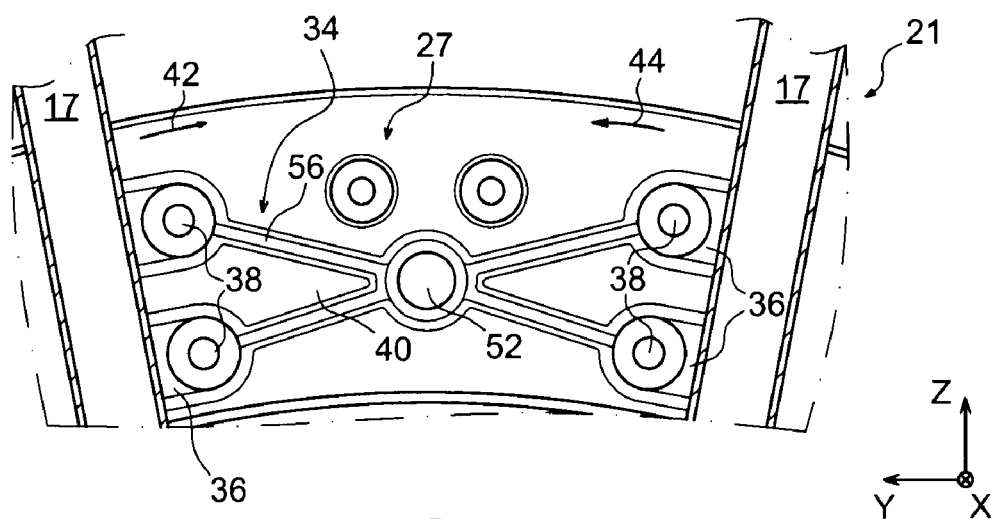
FIG. 3 shows a view in cross section between the two flanges of the intermediate casing and taken along the line III-III of FIG. 1.

With reference firstly to FIG. 3, which shows in particular the rear flange 27 from the front, it is possible to see the first receiving means 34 for receiving the first fixing bracket which carries in an articulated manner the front end of the first rod, these means 34 preferably being made in a single piece, for example by casting, with the flange 27 from which they protrude.

The means 34 comprise four bosses 36 extending from a front face 40 of the flange 27, these bosses taking the form of an increased thickness in the latter. Each of the four bosses 36 is passed through by a substantially axial through-orifice 38 which is designed for the passage of a fixing screw of the bracket. As can be seen in FIG. 3, the four orifices 38 are spaced apart from one another, thus defining corners of a quadrilateral such as a square, a rectangle or even a parallelogram. In the preferred embodiment, two first orifices 38 which are spaced apart from one another in the radial direction but which are not spaced apart angularly are formed on the flange 27 close to a first arm 17, while two second orifices 38 which are spaced apart from one another in the radial direction but which are not spaced apart angularly are formed on the flange 27 close to a second arm 17, directly adjacent to the first. More specifically, the two first orifices 38, or left-hand orifices in FIG. 3, are offset angularly with respect to the first arm 17, namely are offset in a first angular direction 42 which is also referred to as the tangential direction or circumferential direction, whereas the two second orifices 38, or right-hand orifices in FIG. 3, are offset angularly with respect to the second arm 17, namely are offset in a second angular direction 44 opposite the first.

In order to transfer the thrust forces or axial forces coming from the force absorption rods, the bosses 36 extending around the first orifices 38 are extended in the second angular direction 44 until they make contact with the first structural arm 17, namely until they merge into the latter. In the same way, the bosses 36 extending around the second orifices 38 are extended in the first angular direction 42 until they make contact with the second structural arm 17, namely until they also merge into this second arm.

The bosses 38 extend substantially over a constant thickness, which is preferably the same for each of the bosses, each of the latter then taking the shape of a strip which is substantially orthogonal to its associated arm 17, and of greater or lesser length depending on its distance from this same arm.

Figure 4:
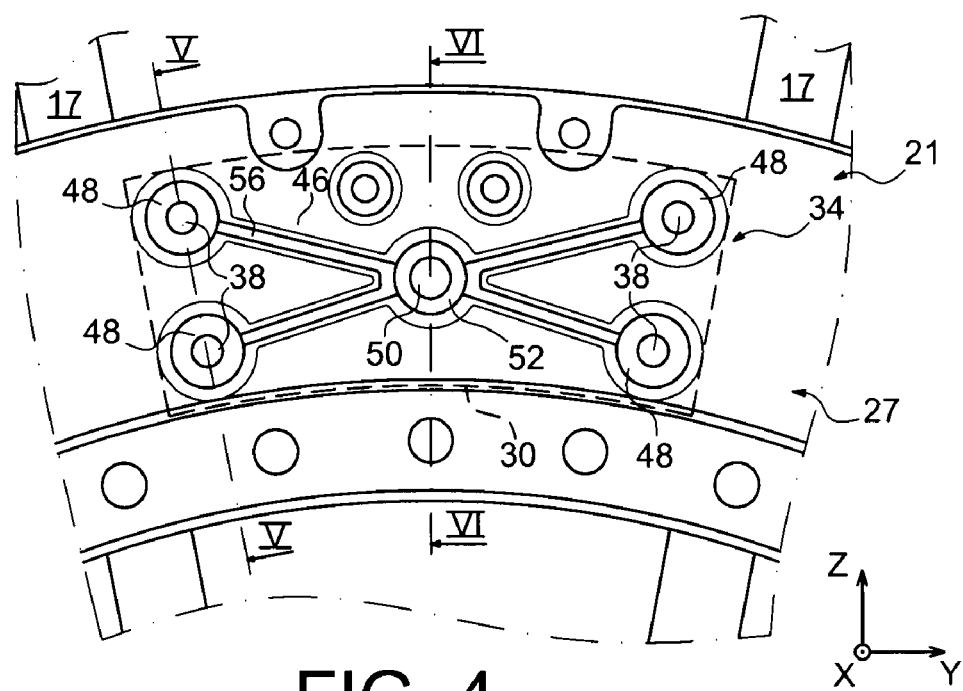
FIG. 4 shows a view in cross section to the rear of the rear flange of the intermediate casing and taken along the line IV-IV of FIG. 1.

With reference now to FIG. 4, which shows the rear face 46 of the flange 27, it is possible to see that each of the through-orifices 38 also passes through an additional boss 48 which protrudes from this rear face. These additional bosses 48, which may be considered to be arranged in the axial extension of the main bosses 36, do not necessarily extend as far as the associated arms 17 but on the contrary adopt in each case a substantially circular conventional shape arranged around the fixing orifice passing through it.

Moreover, the rear end of the additional bosses 48 is preferably flat, and oriented transversely so as to form a support surface which is designed to receiving the rod fixing bracket. In this regard, the four ends in question are preferably coplanar.

By way of example, FIG. 4 schematically shows the fixing bracket 30 in dashed line, showing that the latter has an angular span around the engine axis which is slightly smaller than the angular span between the first and second arms 17.

With reference jointly to FIGS. 3 and 4, it is noted that the first receiving means 34 also comprise an orifice 50, preferably a blind orifice, for housing a shear pin of the rod fixing bracket. This orifice 50, which is preferably substantially axial, is preferably located at or close to the centre of the quadrilateral formed by the four through-orifices 38. Furthermore, this orifice 50 is formed in a boss 52 which protrudes from both sides of the flange 27, the part of this boss located on the front face 40 being closed off, while the part located on the rear face 46 is open for the passage of the shear pin. In the same way as for the additional bosses 48, the end of the boss 52 located on the rear face 46 is preferably flat, and oriented transversely so as to form a support surface which is designed to receive the rod fixing bracket.

In order to transfer the shear forces, also referred to as the transverse forces, introduced into the intermediate casing due to the inclination of the force absorption rods, the receiving means 34 comprise a reinforcing rib 56 which is generally cross-shaped and comprises four branches, protruding from both sides of the rear flange 27. This rib 56, which is also referred to as the X-shaped rib, has a centre passing through the orifice 50 as seen in the axial direction, and therefore passing through the boss 52, and also has four ends which respectively make contact with the four bosses 36 on the front side of the flange 27, these ends effectively merging into the bosses 36. In the same way, the four ends also make contact respectively with the four additional bosses 48 on the rear side of the flange 27.

Figure 5:
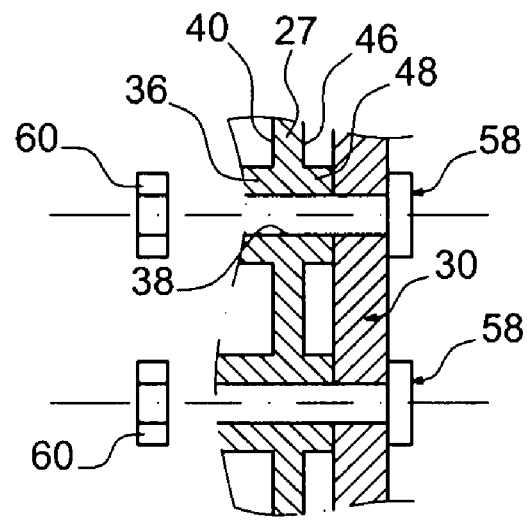
FIG. 5 shows a view in cross section taken along the line V-V of FIG. 4.

With reference now to FIG. 5, it can be seen that, in the configuration shown, the fixing bracket 30 bears against the rear ends of the additional bosses 48. It is held by the presence of the axial fixing screws 58 which each pass successively through a through-orifice of the bracket, the additional boss 48, the flange 27 and the boss 36, each screw 58 cooperating with an appropriate nut 60, preferably tightened against the corresponding boss 36.

Figure 6:
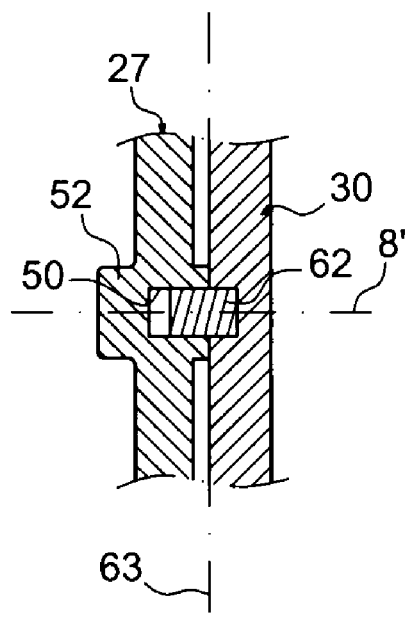
FIG. 6 shows a view in cross section taken along the line VI-VI of FIG. 4.

Furthermore, the bracket 30 fixedly carries the axial fixing pin 62, which passes partially through the boss 52 so as to be housed in the blind orifice 50, as shown in FIG. 6. Furthermore, in order to ensure a better absorption of the forces transmitted by the rods 8, via the brackets 30, the orifice 50 of the pin 62 is preferably centred on the intersection of the axis 8' of the rod (not shown) and of the bearing plane 63 between the rear flange 27 and the bracket 30.

Of course, various modifications may be made by the person skilled in the art to the propulsive assembly 1 for an aircraft which has just been described purely by way of non-limiting example.

The invention claimed is:

1. An intermediate casing for an aircraft jet engine, comprising:
   an outer shell;
   a front transverse flange;
   a rear transverse flange arranged parallel to the front transverse flange, the front and rear transverse flanges disposed radially inside with respect to said outer shell; and
   structural arms which are distributed angularly and extend radially between said front and rear transverse flanges as far as said outer shell,
   wherein said rear transverse flange includes first receiving means for receiving a first fixing bracket to which a first rod is fixed for absorbing thrust forces of the jet engine, said first receiving means including bosses coming from said rear transverse flange, each boss including at least one through-orifice therethrough, through which a fixing screw of said first fixing bracket passes, and said through-orifices being spaced apart angularly with respect to the structural arms, and
   wherein at least one of said bosses extends so as to contact one of said structural arms.

2. The intermediate casing according to claim 1, wherein each of the bosses extends so as to contact one of said structural arms.

3. The intermediate casing according to claim 2, wherein some of the bosses extend so as to contact a given structural arm, and
   wherein other bosses extend so as to contact a structural arm that is directly adjacent to said given structural arm.

4. The intermediate casing according to claim 1, wherein each boss extends over a substantially constant thickness.

5. The intermediate casing according to claim 1, wherein each boss extends from a front face of said rear transverse flange.

6. The intermediate casing according to claim 5, wherein an additional boss which extends from a rear face of said rear transverse flange corresponds with each of said through-orifices.

7. The intermediate casing according to claim 6, wherein each additional boss has a support surface for supporting said first fixing bracket.

8. The intermediate casing according to claim 1, wherein said first receiving means further includes an orifice that houses a shear pin of said first fixing bracket.

9. The intermediate casing according to claim 8, wherein said orifice housing the shear pin is centered on an intersection between an axis of the first rod and a bearing plane between the rear transverse flange and the first fixing bracket.

10. The intermediate casing according to claim 9, wherein there are four bosses, each including a single through-orifice, and
    wherein said first receiving means further includes a reinforcing rib which is cross-shaped and includes four branches extending from said rear transverse flange, a center of the reinforcing rib passing through said orifice, and
    wherein an end of each of the four branches of the reinforcing rib contacts said four bosses, respectively.

11. The intermediate casing according to claim 10, wherein said reinforcing rib extends from a front face and from a rear face of said rear transverse flange.

12. The intermediate casing according to claim 1, wherein said rear transverse flange includes second receiving means for receiving a second fixing bracket to which a second rod is fixed for absorbing the thrust forces of the jet engine, said second receiving means including bosses coming from said rear transverse flange, each boss of the second receiving means including at least one through-orifice therethrough, through which a fixing screw of said second fixing bracket passes, and said through-orifices of the second receiving means being spaced apart angularly with respect to the structural arms, and
    wherein at least one of said bosses of the second receiving means extends so as to contact one of said structural arms.

13. The intermediate casing according to claim 1, wherein the intermediate casing is a single piece.

14. A jet engine for an aircraft, comprising:
    an intermediate casing according to claim 1,
    wherein said outer shell is arranged in a rear extension of a fan casing.

15. A propulsive assembly for an aircraft comprising:
    a jet engine according to claim 14,
    wherein a pylon of said jet engine includes
    a rigid structure, and
    means for attaching said jet engine to said rigid structure, and
    wherein the means for attaching includes said first rod and a second rod for absorbing the thrust forces.

16. The intermediate casing according to claim 1, wherein the at least one boss abuts the one of said structural arms.

* * * * *